United States Patent [19]

Ehrreich et al.

[11] 3,855,016

[45] Dec. 17, 1974

[54] ACICULAR COBALT POWDERS HAVING HIGH SQUARENESSS RATIOS

[75] Inventors: John E. Ehrreich, Wayland; Adrian R. Reti, Cambridge, both of Mass.

[73] Assignee: Graham Magnetics, Inc., Graham, Tex.

[22] Filed: June 28, 1973

[21] Appl. No.: 374,337

Related U.S. Application Data

[63] Continuation of Ser. No. 127,514, March 24, 1971, abandoned.

[52] U.S. Cl. ............ 148/31.57, 75/.5 BA, 148/105, 340/174 NA

[51] Int. Cl. ............ H01f 1/04

[58] Field of Search ......... 340/174 NA; 75/.5 BA, 75/.5 AA; 148/31.5, 105, 108; 117/235

[56] References Cited

UNITED STATES PATENTS

| | | | |
|---|---|---|---|
| 3,535,104 | 10/1970 | Little et al. | 75/.5 BA |
| 3,567,525 | 3/1971 | Graham et al. | 148/105 |
| 3,607,218 | 9/1971 | Akashi | 75/.5 AA |
| 3,755,008 | 9/1973 | Ehrreich et al. | 148/105 |
| 3,803,191 | 4/1974 | Ehrreich et al. | 148/105 |

*Primary Examiner*—Walter R. Satterfield
*Attorney, Agent, or Firm*—Andrew F. Kehoe; Robert A. Cesari; John F. McKenna

[57] ABSTRACT

A superior magnetic recording material is composed of acicular particles consisting predominantly of cobalt metal. The metallic particles are reduced from decomposible, acicular crystals which are prepared by a two-step precipitation process to control their size and shape. Also the crystals are immersed in an organic separating medium before and during reduction so that they do not unduly tend to agglomerate and sinter together.

4 Claims, No Drawings

ACICULAR COBALT POWDERS HAVING HIGH SQUARENESSS RATIOS

This is a continuation of application Ser. No. 127,514, filed 3/24/71 and now abandoned.

BACKGROUND OF THE INVENTION

This invention relates to magnetic powders and their preparation. It relates more particularly to very small ferromagnetic particles of cobalt and its alloys and to a method of making same, and to a magnetic recording member having these particles as its magnetic pigment.

Ferromagnetic particles are employed in a variety of applications. For example, in the form of coatings on tapes, cards, drums and disks, they serve as the recording media for information recorded in magnetic form. They are used also to form magnets. They have further application in connection with microwave circuitry and various electronic equipments.

Ferromagnetic particles of cobalt and cobalt-iron have been known as useful as recording pigments, the particles being produced by a number of old processes. These processes include both the direct chemical reduction of cobalt from an oxide and elecrolytic deposition of the metal. Cobalt particles have also been prepared by thermal decomposition of a cobalt-containing compound such as cobalt carbonyl.

The particles produced with these prior techniques do not form a recording pigment having optimum recording characteristics. The sigma value (the intensity of magnetization (M) divided by the density of the material), is too small, i.e., generally less than 60 e.m.u/g. However, because the prior particles oxidize to an appreciable extent and often carry a surface coating of a polymer to protect them from further oxidation, the sigma values drop below the 60 e.m.u./g. figure.

Another property which is critical to a high-quality recording medium is its squareness characteristic. Squareness is defined as the ratio of the remanent magnetization ($M_r$) to the saturation magnetization ($M_s$). The prior cobalt powders generally have relatively low squareness figures for the bulk material, i.e., less than 0.25.

Furthermore, it has proven difficult to apply these particles to substrates such as tapes so that they are aligned uniformly and are distributed evenly throughout the binder, a practical requirement for high-quality recording. Still further, with respect to the carbonyl process, cost is a negative factor, both because of the cost of the carbonyl itself and because of the special precautions that must be taken to handle this extremely poisonous gas.

Cobalt powder has also been prepared by direct reduction from cobalt hydroxie. The cobalt particles are coated with a polymer and in this form they exhibit a high coercive force. However, these particles are extremely small, e.g., 0.05 micron. Moreover, oxygen can readily diffuse through the polymer coatings and oxidize the cobalt. Since these extremely small cobalt particles have such a very large surface-to-volume ratio, a large proportion of the mass of each particle is slowly oxidized. Thus, the magnetic characteristics of the material are materially degraded with passage of time. Furthermore as noted previously, the presence of polymer on the particles lowers the sigma value. Also sometimes it reacts adversly with the binder on the substrate.

In addition, it has proven difficult to distribute the prior cobalt material uniformly on the tape substrate and align the particles.

As a result of aforementioned difficulties, cobalt metal particles have not been used as a recording pigment to any great extent. Rather, the industry has turned to the metal oxides such as iron oxide.

SUMMARY OF THE INVENTION

Accordingly, this invention aims to provide magnetic cobalt-containing particles having superior magnetic characteristics which enable them to be used as a high-quality magnetic recording pigment.

Another object of the invention is to provide single domain cobalt and cobalt-containing particles.

A further object of the invention is to provide cobalt and cobalt-containing particles which are characterized by minimal interparticles agglomeration.

Still another object of the invention is to provide a powder-like recording pigment composed of essentially single-domain ferromagnetic cobalt or cobalt-containing particles of relatively uniform shape.

Another object of the invention is to provide a method of making cobalt and cobalt-containing particles having one or more of the above characterisitics.

A further object of the invention is to provide superior magnetic recording members having the above improved ferromagnetic cobalt and cobalt-containing particles as the recording pigment.

The invention accordingly comprises the several steps and the relation of one or more of such steps with respect to each of the others, and the articles possessing the features, properties, and the relation of elements, which are exemplified in the following detailed disclosure, and the scope of the invention will be indicated in the claims.

In general, the objects of this invention are accomplished by providing small, acicular ferromagnetic cobalt and cobalt-containing particles of uniform shape which do not tend to agglomerate during their fabrication. These particles are usually composed predominantly of cobalt metal and always comprise at least 43 percent by weight of cobalt. These needle-like particles have a typical diameter of 0.02 to 0.5 micron and a typical length of 0.1 to 2.0 microns. They may consist substantially entirely of cobalt or may contain cobalt alloyed with other metals.

Measurements on a bulk sample of unoriented cobalt particles of this invention give coercivities greater than 400 oersteds with typical values ranging from 600 to 1,000 oersteds and more. The samples also have high saturation magnetization, in excess of 60 e.m.u./g. Still further, the bulk material is characterized by a high degree of squareness, e.g., ratios on the order of 0.25 to 0.5.

Thus we have found that the acicular cobalt and cobalt-containing particles of this invention have magnetic and physical properties which make them especially suitable as the magnetic pigment in magnetic recording members. Furthermore, these desirable characteristics do not materially degrade with time. The advantages of the recording members are not only due to the magnetic characteristics of the particles noted above but also they are due to the fact the acicular particles can be oriented in essentially the same direction and can be distributed in a very thin layer with a close relationship to one another in a binder on a substrate. This, in turn, results in more uniform magnetic characteristics in a recording member incorporating these particles as the recording pigment.

Our process for producing magnetic particles may be divided into two basic parts. First, we create a multiplicity of very small, decomposable, acicular cobalt salt particles. Then, we coat the salt particles with, or immerse them in, an organic material such as silicon oil, polyacrylic ester, resin or the like, and heat the coated particles in a reducing atmosphere. The material minimizes inter-particle agglomeration or sintering so that each particle is reduced to a metal while still maintaining its individual acicular shape. The coating is substantially eliminated either by later washing in a suitable solvent or by thermal decomposition during the firing step, or by evaporation or sublimation or the like so that it does not materially degrade the magnetic and physical characteristics of a recording member incorporating the resulting metal particles.

Cobalt or cobalt-containing particles made in this way tend to be quite pyrophoric initially. Therefore, care must be taken at the outset to maintain them in a substantially oxygen-free atmosphere and to bring them into contact with oxygen relatively slowly. In time, e.g., as little as 8 hours, a very thin oxide surface coating forms on the particles, retarding their further oxidation and thus rendering them stable. It should be understood that this oxide coating forms only a minor portion of each particle. Consequently, the particle is composed largely of pure cobalt or cobalt alloy.

The cobalt-containing crystals from which the cobalt particles are reduced should themselves be small and acicular. In accordance with the present invention, they are produced by a two -step or successive precipitation process. Specifically, we use a double precipitation process in which we first precipitate a compound having the requisite particle size but not the desired acicular shape. This first precipitate is then reacted to precipitate an acicular crystalline salt that can subsequently be treated to provide acicular metal particles.

The first precipitate is preferably highly insoluble and therefore it has a very low concentration in solution. The second precipitate is also highly insoluble. Consequently, there is little material in solution to support crystal growth of the second precipitate. As discussed below, this permits controlled acicular crystal growth and, specifically, it permits size control within desirable limits, e.g., about 0.06 to 2 microns in diameter, with lengths of 0.3 to 6 microns.

More particularly, a finely divided cobalt-containing suspension such as the hydroxide or the carbonate is prepared by mixing an aqueous solution of sodium hydroxide or sodium carbonate with an aqueous solution of a cobalt salt, such as cobalt chloride. Then, oxalic acid is reacted with the suspension to form cobalt oxalate. In practice, relatively low precipitation temperatures, e.g., 20°C, should be used because this tends to provide sufficiently small particle size. Also, each mixture is vigorously agitated to minimize agglometration of the precipitate.

We do not fully understand why this process readily provides the desired oxalate particle size and shape. However, it appears that the parent hydroxide (or carbonate) particles serve not only as sources of the cobalt ions, but also as nucleating sites for the oxalate crystals. Secondly, with the very dilute solution resulting from low solubility, crystal growth is probably limited by a boundary layer around each crystal and, especially in a vigourously agitated suspension, the boundary layer is thinner at the ends than the sides of these particles, thereby promoting acicular growth. Furthermore, the parent particles serve as reservoirs to replace the cobalt ions that are taken up by the oxalate crystals.

In this fashion, the process provides the desired low concentration without requiring an unduly large volume of solution to provide a reasonably large yield of the orgainc cobalt salt. Also important is the fact the hydroxide particles are used up in the process. These "disappearing" sites thus leave no impurities in the final material.

Moreover, in the nature of things, the acicular cobalt oxalate crystals provide an acicular shape for the cobalt particles reduced therefrom. Finally, the oxalate has a relatively low molecular weight, that is, the organic radical does not take up as much of the volume as would high molecular weight mateials. In the ensuing reduction of the cobalt, this aids in providing compact particles with minimum shrinkage.

Preferably, also, the precipitation is carried out in a water-alcohol mixture to minimize solubility of the precipitate. This discourages excessive growth of the oxalate crystals and facilitates particle size control by means of the water-alcohol ratio. It also appears to increase acicularity. Excellent results have been obtained with a 50—50 percent water-alcohol mixture and mixtures containing up to 90 percent alcohol have been tried with good results. Also acetone and other water soluble solvents may be used in lieu of alcohol. Apparently for reasons not clearly understood, some water is needed in order to produce reasonably good oxalate crystals.

In the case of cobalt oxalate, length-to-diameter ratios of the order of 10-to-1 have been obtained. On the other hand, with iron oxalate and iron-cobalt oxalate, length-to-diameter ratios are of the order of 3-to-1. These particles are further characterized by being very small, e.g., as low as 0.05 micron in diameter and by being relatively uniform in size.

During reduction of the oxalate crystals to metal particles, acicularity should be preserved and interparticle agglomeration should be avoided. This is the reason for the organic coatings on the individual particles. These coatings and their residues keep the particles sufficiently apart during reduction to prevent their sintering together at the high temperatures involbed in hydrogen reduction. The coating can be such that the bulk of it is removed from the particle by decomposition during pyrolysis and subsequent heat treatment. Also it can be removed by subsequent washing in a suitable solvent. In some cases it may evaporate or sublimate. We intend that all of these processes be embraced within the term "removed." In any event, the coating does not unduly interfere with the physical and magnetic characteristics of the particle.

Polymers and other organic chemicals that have been used as the coating material include silicone oil, silicone polymer, silanes, epoxy resin, polyacrylic ester, and polyurethane. Usually the organic material is applied in a suitable solvent to ensure complete coverage of the oxalate crytals. Alternatively, the praticles can be immersed in the organic medium if it is a liquid such as, for example, a liquid hydrocarbon.

In the reduction step, the coated oxalate particles are heated to a temperature of approximately 325°–410°C in a reducing atmosphere such as hydrogen or hydrogen-nitrogen to reduce the cobalt (or cobalt alloy) and, at the same time, internally sinter the cobalt in each particle. If the reducing temperature falls much below 330°C, the oxalate crystals do not decompose readily. On the other hand, if the reducing temperature exceeds 400°C, inter-particle sintering starts to occur and the resulting agglomerates degrade the magnetic characteristics of the material. We have found that a temperature of about 370°C produces optimum results.

Bulk samples of unoriented acicular cobalt and cobalt-alloy particles of this invention exhibit high coercivity and sigma values and are characterized by a high degree of squareness. In practice, masses of unbound particles exhibit coercivities ranging from 400 up to over 1,000 oersteds. The saturation magnetization values of our acicular cobalt powders range from 60 to 120 e.m.u./g. which is significantly greater than the corresponding values exhibited by conventional materials. Finally, our material may have a squareness figure as high as 0.5. These attributes make the material especially useful as the recording pigment in high-quality recording members.

The magnetic measurements on the various samples in this application were done on a vibrating sample magnetometer at the Magnetics Laboratory at the Department of Electrical Engineering at the University of Minnesota. Generally, two hysteresis loops were traced for each sample: one at about 1 kilo-oersted peak-field at a field frequency of 60 Hz and one at about 8 kilo-oersted field. By measuring the saturation magnetic moment of the sample, one may calculate the fraction of pure cobalt in the sample as follows:

Fraction of cobalt $= 4.7/(1+582/M_s)$ where $M_s$ is the saturation magnetization of the sample in e.m.u./g.

A magnetic recording member is conveniently made in accordance with this invention. The member comprises a nonmagnetic substrate (e.g., polyester or the like) containing acicular, cobalt containing particles as described herein evenly dispersed in a suitable binder and coated onto the substrate.

Cobalt particles, e.g., those made in accordance with Example 8 of this invention, are not sintered together but are attracted together because they are magnetic.

SPECIFIC DESCRIPTION

The invention is further illustrated by the following examples:

EXAMPLE 1

A quantity of 238 g. of $CoCl_2$ is dissolved in a container to form a 1 liter aqueous solution. Then 100 g. of sodium hydroxide is dissolved in a second container to form a second 1 liter aqueous solution. The cobalt chloride and sodium hydroxide solutions are mixed together, using a magnetic agitator bar, in a 4 liter breaker for 3 minutes to form a cobalt hydroxide precipitate. The 135 g. of oxalic acid are dissolbed in a separated container to form a 1 ½liter aqueous solution. The oxalic acid solution is mixed thoroughly into the cobalt hydroxide precipitate for 5 minutes to form a cobalt oxalate precipitate. The resultant mixture is filtered in a Buchner funnel and washed several times with water. Then it is rinsed several times with acetone and air dried. The resulting cobalt oxalate particles are acicular, (that is "needle-shaped"). Following this, 0.05 g. of silicone polymer oil (sold under the trade designation, G. E. RTV910 Diluent) is mixed with 0.95 g. of the acicular cobalt oxalate particles using sufficient tetrahydrofuran to insure uniform coating of th silicone oil on the particles. Next, the coated particles are air dried. Then the coated particles are charged into a 1 inch diameter glass tube in a tube furnace, heated to 360°C in a hydrogen atmosphere, and held at this temperature for 1 hour, thereby reducing the metal salt to cobalt. The material is then cooled to room temperture while still in a hydrogen atmosphere, and subjected to a 2 minute argon purge. Next the product is washed several times with acetone. A magnet is used to effect separation from the wash, and the separated material is air dried. The resulting product is a strongly magnetic powder having a coercivity of 705 oersteds, a sigma value of 82 e.m.u./g., and a squareness figure 0.40. The particles are composed mainly of cobalt, and have little or no silicone oil on their surfaces. Also the cobalt particles are acicular with an average particle size of 0.3 microns in diameter by 1 micron in length.

EXAMPLE 2

Cobalt particles are prepared as described in Example 1, except that the cobalt oxalate crystals are not coated with silicone oil during their reduction step. Now the resultant cobalt paticles have a coercivity of 313 oersteds, a sigma value of 101 e.m.u./g., and a squareness characterisitic of only 0.21.

EXAMPLE 3

Cobalt oxalate crystals are prepared in accordance with Example 1. Then 0.05 g. of silane, (sold under the trade designation Dow-Corning Z6020), is mixed with 0.95 g. of oxalate crystals prepared in accordance with Example 1 using a small quantity of tetrahydorfuran as a solvent for the silane to insure coating of the silane on the particles. The the coated particles are air dried. Following this, the coated metal salt is charged into a glass tube furnace. The material is heated to 360°C under an argon atmosphere for one-half hour. It is held at 360°C under a hydrogen atmosphere for a period of 1 hour. Following this, it is cooled to room temperature while still in a hydrogen atmosphere and then subjected to a 2-minute argon purge. Then the cooled product is washed several times with acetone, using a magnet to affect separation of the particles after each wash, and air dried. The product obtained had a coercivity of 810 oersteds, a sigma value of 72.5 e.m.u./g. and a squareness characteristic of 0.43. The powder was composed of acicular cobalr particles.

EXAMPLE 4

A quantity of 2.0 grams of 2½ percent epoxy-solution (5 g. of epoxy sold by Resyn Corporation under the name Resypox 1628, 0.75 g. of tetraethylenepentamine) in tetrahydrofuran is mixed with 0.95 g. of cobalt oxalate prepared in accordance with Example 1, and an additional quantity of 2.05 g. of tetrahydrofuran is added to insure complete coating of the oxalate particles. Then the coated material is air dried. The coated material is charged into a glass tube in a tube furnace, heated to 360°C in an argon atmosphere for one-half hour, and held at 360°C in a hydrogen atmosphere for 1 hour. Following this, it is cooled to room temperature while still in a hydrogen atmosphere and subjected to a 2-minute argon purge before being washed several times with acetone. A magnet is used to effect separation of the metal powder from the wash liquid. Thereupon the material is air dried. The dry product has a coercivity of 825 oersteds, a sigma value of 75.5 e.m.u./g. and a squareness characteristic of 0.45. The powder is composed of essentially pure cobalt particles bearing little residual organic coating.

EXAMPLE 5

A quantity of 2.0 g. of 2½ percent G. E. Se–33 silicone gumstock dissolved in tetrahydrofuran is mixed with 0.95 g. of cobalt oxalate salt prepared in accordance with Example 1 and with 2.0 grams of tetrahydrofuran to insure complete coating of the salt particles. The coated material is then air dried (mixed). Following this the coated salt particles are charged into a glass tube, placed in a tube furnace, and heated to 360°C in an argon atmosphere for one-half hour. Then the material is held at this same temperature for 1 hour before being cooled to room temperature while still in the hydrogen atmosphere. Following a 2-minute argon purge, the material is washed with acetone using a magnet to effect separation from each wash liquid, and air dried. The product obtained is a ferromagnetic metallic powder having a coercivity of 750 oersteds, a sigma value of 77 e.m.u./g. and squareness characteristic of 0.42. The powder is composed of acicular cobalt particles.

EXAMPLE 6

A quantity of 238 g. of $CoCl_2 . 6H_2O$ is dissolved in a container in 500 ml. of denatured alcohol and 500 ml. of water. Also 80 g. of sodium hydroxide is dissolved in a separate container in 500 ml. of water and 500 ml. of denatured alcohol. Then the solution is cooled to room temperature. Following this, the cobalt chloride and sodium hydroxide solutions are mixed together in a 4-liter breaker in a magnetic mixer for 5 minutes. During this period, a cobalt hydroxide precipitate forms in the beaker. In a separate breaker, 135 g. of oxalic acid are dissolved in 750 ml. denatured alcohol and 750 ml. of water. The oxalic acid solution is mixed into the cobalt hydroxide precipitate for 5 minutes to form a cobalt oxalate precipitate. The precipitate is filtered in a Buchner funnel and the oxalte cake is washed with 2 liters of acetone. Then the oxalate is redispersed in 1 liter of acetone and then filtered The acetone-wet cake is mixed with 75 grams of 10 percent solution of Estane 5702, a polyurethane-type rubber, manufactured by B. F. Goodrich & Co. in tetrohydrofuran. This mix is spread on a polyethylene sheet to air dry. Coated oxalate salt is then charged into an aluminum boat which is approximately 16 inches long and 2½ inches wide and 1.9 inches high. The interior of this boat is separated into four elongate compartments by three equally spaced and centered fins. The filled boat is placed in a sealed 2½ inch diameter stainless steel tube. The tube in turn is placed in a 3-inch diameter 24 inches long, tube furnace so that the filled aluminum boat is equally distant from each end of the furnace. Argon is fed through the stainless steel tube at a rate of 800 cc. per minute. At the same time, heat is applied to the stainless steel tube and in 1 hour the contents of the boat reaches 360°C. After 30 minutes, the atmosphere is changed to hydrogen, which is passed through the tube at a flow rate of 800 cc. per minute for a period of 2 hours. The stainless steel tube with the filled aluminum boat therein is taken out of the furnace and cooled externally with ice while still maintaining the boat in a hydrogen atmosphere and the contents allowed to reach room temperature. Finally, a 10-minute argon purge is passed through the tube at a rate of 800 cc. per minute. The contents of the boat are then transferred to a polyethylene bag filled with argon. Care is taken to prevent contact with air, becuase at this point the material is extremely pyrophoric. After 4 days, two pinholes are pierced in the bag so that the contents of the bag are exposed to a very slowly increasing oxygen concentration. The product is then removed from the bag after 4 more days.

The resulting product obtained is ferromagnetic metallic powder having a coercivity of 813 oersteds, a sigma value of 86 e.m.u./g. and a squareness characteristic of 0.46. The powder is non-pyrophoric and is composed of acicular cobalt particles having cobalt oxide coatings and exhibiting minimal interparticle sintering.

EXAMPLE 7

A quantity of 100 g. of coated cobalt oxalate is prepared in accordance with Example 6 and charged into an aluminum boat. The boat is 16 inches long and 1.72 inches wide and 1.3 inches high and has two equally spaced lengthwise fins which divide the boat into three elongated compartments. The filled boat is charged into a sealed 2-inch diameter stainless steel tube. The tube is then placed in an aluminum muffle in a 3-inch diameter by 24-inch long tube furnace such that the filled aluminum boat is equally distant from each end of the furnace. Argon is then fed through the stainless steel tube at a rate of 400 cc. per minute. At the same time, heat is applied and the stainless steel tube is brought up to a 380°C. Ninety minutes after startup, the gas is changed to hydrogen at a rate of 400 cc. per minute and temperature is maintained at 380°C for 120 minutes. Following this the stainless steel tube containing the filled aluminum boat is taken out of the furnace and cooled externally with ice and the contents allowed to reach room temperature in a hydrogen atmosphere. Then the reactor is purged with argon for 10 minutes at a rate of 400 cc. per minute. The contents in the boat are then transferred to a polyethlene bag with an argon atmosphere without allowing air to come into contact with the contents. After 4 days two holes are pierced in the bag so that the contents of the bag are exposed to oxygen only very gradually. After 4 more days the contents are removed from the bag. The product obtained is a ferromagnetic powder with a coercivity of 940 oersteds, a sigma value of 98 e.m.u./g. and a squareness characteristic of 0.45. The powder is composed of substantially acicular cobalt particles which carry oxide coatings so that they are stable.

EXAMPLE 8

Coated oxalate crystals are prepared in accordance with Example 6 except that the acetone wet cake is mixed with 75 g. of epoxy solution (10 grams of epoxy sold by Resyn Corporation under the name Resypox 1628, 1.4 grams of tetraethylenepentamine, 90 grams of acetone). The mixture is spread on a sheet of polyethlene and air dried and allowed to cure at room temperature. Following this, a quantity of 100 *g.* of pre-coated cobalt oxalate is charged into an aluminum boat and reduced in accordance with the procedure described in Example 7. The material obtained is a black ferromagnetic powder having a coercivity of 938 oersteds, a sigma value of 113 e.m.u./g. and a squareness characteristic of 0.50. The powder is comprised of very small acicular cobalt particles with oxide coatings which render them stable.

EXAMPLE 9

Cobalt oxalate crystals are prepared in accordance with Example 6 except that the acetone wet cobalt oxalate cake is divided into 22, 40-gram batches each batch containing 6.68 grams of cobalt oxaltate. Each batch is then sealed in a 2-ounce bottle and is stored for use in subsequent work. Following this, 3.5 g. of an acetone solution containing 10 percent polyurethane sold under the trade designation Estane 5702 by B. F. Goodrich, is mixed with the contents of one bottle. The contents is then emptied from the bottle onto a polyethylene sheet, spread out and air diried. The mix is then charged into a 1-inch diameter glass tube in a tube furnace and heated to 360°C in an argon atmosphere for 20 minutes. The material is held at this temperature in argon for 25 minutes and held for a further 80 minutes at the same temperature in a hydrogen atmosphere. The mix is then cooled in the hydrogen atmosphere at room temperature and subjected to a 2-minute argon purge. The contents of the tube are then poured into an argon filled polyethylene bag and sealed. After 4 days, two holes are punched in the bag so that the oxygen gradually contacts the contents of the bag. The material removed from the bas is a ferromagnetic powder having a coercivity of 875 oersteds, a sigma value of 84 c.m.u./g. and a squareness characteristic of 0.415. The powder is composed of ferromagnetic acicular cobalt particles having oxide coatings which render them stable.

EXAMPLE 10

A quantity of 1.75 grams of an acetone solution containing 10 percent polyurethane sold under the trade designation Estane 5702 by B. F. Goodrich Co., are mixed with the contents of another bottle of the oxalate in Example 9 and the resulting mix is spread out on a sheet of polyethylene and air dried. This dried mix is charged into a tube and heated as described in Example 9. The resultant product is a ferromagnetic powder having a coercivity of 625 oersteds, a sigma value of 92 e.m.u./g. and a squareness characteristic of 0.31. Again the powder is coomposed of very small stable acicular cobalt particles.

EXAMPLE 11

A quantity of 7 grams of polyurethane solution described in Examples 9 and 10 is mixed with the contents of a third bottle of oxalate stored for use in Example 9. The mix is then spread on a sheet of polyethylene and air dried. Folowing this the material is reduced as described in Example 9. The product obtained is a ferromagnetic powder having a coercivity of 937 oersteds, a sigma value of 79 e.m.u./g. and a squareness characteristic of 0.46.

EXAMPLE 12

The coated cobalt oxalate crystals are prepared in accordance wth example 9 except that the bottle contents are mixed with 3.5 grams of a 10 percent solution of Resypox 1574 solid epoxy sold by Resyn Corporation in acetone. The epoxy contains no curing agent. The resultant mix is spread on a sheet of polyethylene and air dried and reduced to produce a ferromagnetic powder as described in Example 9. The ferromagnetic powder obtained has a coercivity of 875 oersteds, a sigma value of 92 e.m.u./g. and a squareness characteristic of 0.40.

EXAMPLE 13

A quantity of 3.5 grams of a solution containing 5 percent Estane 5702 polyurethane and 0.5 percent of a silica sold under the trade destination HiSil 233 in acetone is mixed with the contents of another bottle of the material in Example 9. The mix is then spread on a sheet of polyethylene and air dried. Following this, is reduced as described in Example 9. The powder obtained has a coercivity of 500 oersteds, a sigma value of 97 e.m.u./g. and the squareness characteristic of 0.30.

EXAMPLE 14

The material in another bottle of Example 9 is air dried and treated in accordance with that Example except that the cobalt oxalate salt particles are left uncoated. The product obtained is a powder composed of cobalt particles which are substantially sintered together. The material has a coercivity of 313 oersteds, a sigma value of 97 e.m.u./g. and a squareness characteristic of 0.22.

EXAMPLE 15

A quantity of 12.08 $CoCl_2 \cdot 6H_2O$ and 10.0 g. $FeCl_2 \cdot 4H_2O$ is dissolved in 50 ml. denatured alcohol and 50 ml. of water in a container.

Also 8.0 g. sodium hydroxide is dissolved in 50 ml. alcohol and 50 ml. water in a second container. The two solutions are mixed together in a magnetic stirrer for 2 minutes at room temperature to form an iron-cobalt hydroxide precipitate. Then a quantity of 13.5 g. of oxalic acid dissolved in 75 ml. denatured alcohol and 75 ml. water is mixed with the precipitate for 2 minutes. The resultant mixture is filtered in a Buchner funnel and washed several times with acetone and air dried. Following this, 1.0 g. of the material is coated with a 5 percent Estane 5702 polyurethane described in Example 10 and charged into a 1-inch diameter glass tube in a tube furnace and heated for 30 minutes at 360°C in argon then it is held at 360°C in hydrogen for 90 minutes. Following this it is cooled to room temperature in hydrogen and then subjected to a 2-minute argon purge. The resulting powder was composed of stable iron cobalt particles and had a coercivity of 750 oersteds, a sigma value of 90 e.m.u./g. and a squareness of 0.43.

EXAMPLE 16

A quantity of 10 g. of sodium hydroxide is dissolved in water to form a 100 ml. of solution. Also 23.8 grams of cobalt chloride $CoCl_2 \cdot 6H_2O$ is dissolved separately in water to form a 100 ml. solution. The two aqueous solutions are then mixed together in a beaker in a magnetic mixer for 3 minutes forming a cobalt hydroxide precipitate. The precipitate is at room temperature. Then 150 ml. of 1 M oxalic acid is mixed into a cobalt hydroxide precipitate for 5 minutes at room temperature. The resultant product is a precipitate of cobalt oxalate salt which is then filtered in a Buchner funnel. Following this, the oxalate cake is washed several times with water, then with acetone, and finally is air dried. The resultant product is composed of cobalt oxalate crystals with an average particle size of 3.0 micron in length and 1.0 micron in diameter. Following this the cobalt oxalate crystals are coated with 5 percent epoxy-hardner and reduced as described in Example 4. The resultant product is a ferromagnetic powder having a coercivity of 825 oersteds, a sigma value of 75.5 e.m.u./g. and a squareness characteristic of 0.45. The powder is composed of substantially unsintered acicular stable particles composed of cobalt. The particles have an average particle size of 0.3 micron in diameter and 1.0 micron in length.

EXAMPLE 17

A quantity of 238 g. sodium hydroxide is dissolved in a solution of 90 ml. denatured alcohol and 10 ml. water. Also 23.8 g. of cobalt chloride ($CoCl_2.6H_2O$ is dissolved in a second container with 90 ml. denatured alcohol and 10 ml. water. The contents of the two containers are mixed together in a magnetic mixer at room temperature for 5 minutes to form a cobalt hydroxide precipitate. Then 13.5 g. oxalic acid are dissolved in 135 ml. denatured alcohol and 15 ml. water are mixed with the cobalt hydroxide precipitate for 5 minutes at room temperature. The resultant mix is then filtered through a Buchner funnel, washed with acetone and air dried. The product obtained is a cobalt oxalate precipitate with the oxalate crystals having an average particle size of 0.1 micron in diameter and 1.0 micron in length. The cobalt oxalate crystals are then coated with a 10 percent epoxy solution-hardener and reduced as described in Example 8. The resultant product is a stable ferromagnetic powder composed of substantially unsintered cobalt metal particles having an average particle size of 0.035 micron in diameter and 0.35 micron in length. The powder has a coercivity of 750 oersteds, a sigma value of 29 e.m.u./g. and a squareness of 0.43.

EXAMPLE 18

The following three solutions are prepared.

A. 20.0 grams methyl ethyl ketone
   0.10 grams of soya lecithin, Yelkins TTS

B. 3.7 grams of Estane 5702 Fl, B. F. Goodrich Chemical Company
   10.0 grams of methyl ethyl ketone C. 3.7 grams of Saran, F 130, Dow Chemical Company
   0.10 grams of Versilube F–50 silicone oil, General Electric Company
   12.0 grams of methyl ethyl ketone A quantity of 17.0 grams of acicluar cobalt powder is prepared as in Example 8. The cobalt powder is added to solution A while mixing in a Waring Industrial Blender and this mixture is allowed to stand for 17 hours. Solution B is then added slowly while mixing in the Waring Blender, and the resulting mixture is poured into a one quart steel jar containing 125 grams of ¼ diameter steel balls. The jar is capped and then shaken for 1.5 hours on a Red Devil Paint Conditioner, Model No. 5110. Then the mixture is separated from the steel balls by straining and weighing. For each 1.0 gram mix obtained, 0.47 grams of solution C was added under the action of the Waring Blender.

The resulting mix is then coated onto 1.42 mil polyethylene terephthalate film with a Bird Film Applicator and then passed over a 1,200 gauss bar magnet to achieve particle orientation. The film is dried for 5 minutes at room temperature and then 5 minutes at 100°C. The coated film is then subjected to measurements in a Research Engineering and Development, Inc. 5–H meter at 5,000 oersted applied field. The tape has a coercivity of 1,000 oersteds, a squareness characteristic of 0.6, and a saturation magnetization (Ms) of 2,300 gauss. The volume fraction of cobalt in the cating is 21 percent. Conventional iron oxide tape prepared in the same way and with the same volume fraction of HR–280 iron oxide (by Hercules, Inc.) has a coercivity of 250 oersted, a squareness of 0.66 and an Ms of 1,025 gauss.

We claim:

1. A ferromagnetic composition formed of a mass of acicular metallic particles having an average miniumum length of 0.1 microns and a maximum average diameter of 2 microns and comprising at least 43 percent by weight of cobalt, said mass having a coercive force of at least 600 oersteds; a sigma value of from 75 to 120 e.m.u. per gram; and a squareness characteristic of from 0.4 to 0.5.

2. A magnetic recording member comprising a carrier of nonmagentic material having bonded thereto the ferro-magnetic composition defined in claim 1, and a binder therefor.

3. A composition defined in claim 1 wherein said particles are predominatly cobalt and wherein said squareness is 0.43 or greater and said sigma value is 100 or greater.

4. A magnetic recording member comprising a carrier of nonmagnetic material having bonded thereto the ferro-magnetic composition defined in claim 3, and a binder therefor.

* * * * *

UNITED STATES PATENT OFFICE

CERTIFICATE OF CORRECTION

Patent No. 3,855,016 Dated December 17, 1974

Inventor(s) John E. Ehrreich and Adrian R. Reti

It is certified that error appears in the above-identified patent and that said Letters Patent are hereby corrected as shown below:

Column 1, line 56 "hydroxie" should be --hydroxide--;
Column 3, line 9 "silicon" should be --silicone--;
Column 3, line 62 "agglomertration" should be --agglomeration--;
Column 4, line 66 "praticles" should be --particles--;
Column 5, line 62 "breaker" should be --beaker--;
Column 5, line 63 "dissolbed" should be --dissolved--;
Column 6, line 13 "temperture" should be --temperature--;
Column 6, line 42 "The" should be --Then--;
Column 6, line 56 "cobalr" should be --cobalt--;
Column 7, line 43 "breaker" should be --beaker--;
Column 7, line 45 "breaker" should be --beaker--;
Column 7, line 49 "oxalte" should be --oxalate--;
Column 8, line 12 "becuase" should be --because--;
Column 9, line 24 "diried" should be --dried--;
Column 9, line 37 "bas" should be --bag--;
Column 9, line 55 "coomposed" should be --composed--;
Column 9, line 63 "Folowing" should be --Following--;
Column 12, line 27 "cating" should be --coating--;

Signed and sealed this 10th day of June 1975.

(SEAL)
Attest:

RUTH C. MASON
Attesting Officer

C. MARSHALL DANN
Commissioner of Patents
and Trademarks